United States Patent [19]
O'Melia

[11] 3,794,724
[45] Feb. 26, 1974

[54] USE OF SUBSTITUTED (TRIFLUOROMETHYL)PYRIDYL PHOSPHATES AND PHOSPHOROTHIOATES AS NEMATICIDES

[75] Inventor: Frances C. O'Melia, Pleasant Hill, Calif.

[73] Assignee: The Dow Chemical Company, Midland, Mich.

[22] Filed: Dec. 1, 1971

[21] Appl. No.: 203,906

Related U.S. Application Data

[63] Continuation-in-part of Ser. No. 99,666, Dec. 18, 1970, abandoned.

[52] U.S. Cl. .............................................. 424/200
[51] Int. Cl. ............................................. A01n 9/36
[58] Field of Search... 424/200; 200/294.8 K, 297 R

[56] References Cited
UNITED STATES PATENTS

| | | | |
|---|---|---|---|
| 3,244,586 | 4/1966 | Ricerink | 424/200 |
| 3,691,282 | 9/1972 | Docret et al. | 424/200 |
| 2,754,302 | 7/1956 | Gysin et al. | 260/297 |

Primary Examiner—Sam Rosen
Assistant Examiner—Leonard Schenkman
Attorney, Agent, or Firm—Gary D. Street; C. Kenneth Bjork; William M. Yates

[57] ABSTRACT

Soil nematodes are controlled by applying to infected soil effective amounts of substituted (trifluoromethyl)-pyridyl phosphates and phosphorothioates of the formula

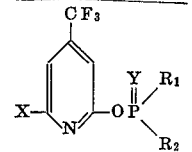

wherein
X is bromo, chloro, fluoro or iodo;
Y is oxygen or sulfur, and
$R_1$ and $R_2$ each independently represent a member selected from the group consisting of loweralkoxy, lower-alkylthio, amino, and loweralkylamino.

13 Claims, No Drawings

USE OF SUBSTITUTED (TRIFLUOROMETHYL)PYRIDYL PHOSPHATES AND PHOSPHOROTHIOATES AS NEMATICIDES

CROSS-REFERENCE TO RELATED APPLICATION

The present application is a continuation-in-part of my previous application Ser. No. 99,666 filed Dec. 18, 1970 now abandoned.

SUMMARY OF THE INVENTION

The present invention relates to compositions and methods for the control of plant pathogenic nematodes employing as essential active ingredients certain substituted (trifluoromethyl)pyridyl phosphates and phosphorothioates having the formula

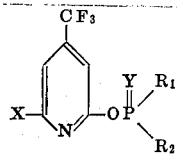
(I)

wherein
X is bromo, chloro, fluoro or iodo;
Y is oxygen or sulfur; and
$R_1$ and $R_2$ each independently represent a member selected from the group consisting of amino, loweralkyl-amino containing from 1 to 4 carbon atoms, loweralkoxy containing from 1 to 4 carbon atoms, and loweralkylthio containing from 1 to 4 carbon atoms.

As used herein, the term "loweralkyl" means saturated, monovalent aliphatic radicals, including straight and branched-chain radicals of from 1 to 4 carbon atoms, as illustrated by methyl, ethyl, propyl, isopropyl, butyl, sec.-butyl and the like, while the term "halo," when used herein, means bromo, chloro, fluoro and iodo.

Examples of suitable nematicide compounds of the above formula include:

O-(6-chloro-4-(trifluoromethyl)-2-pyridyl) O,O-diethyl phosphorothioate;
O-(6-chloro-4-(trifluoromethyl)-2-pyridyl) O,O-diethyl phosphate;
O-(6-chloro-4-(trifluoromethyl)-2-pyridyl) O,O-dimethyl phosphorothioate;
O-(6-chloro-4-(trifluoromethyl)-2-pyridyl) N,N'-dimethyl phosphorodiamidothioate;
O-(6-chloro-4-(trifluoromethyl)-2-pyridyl) O-methyl isopropylphosphoramidothioate;
O-(6-chloro-4-(trifluoromethyl)-2-pyridyl) O,O-di-n-butyl phosphate;
O-(6-bromo-4-(trifluoromethyl)-2-pyridyl) O,O-dimethyl phosphorothioate;
O-(6-fluoro-4-(trifluoromethyl)-2-pyridyl) O,O-diethyl phosphorothioate;
O-(6-fluoro-4-(trifluoromethyl)-2-pyridyl) N,N'-dimethyl phosphorodiamidothioate;
O-(6-fluoro-4-(trifluoromethyl)-2-pyridyl) O-ethyl ethylphosphoramidothioate;
O-(6-iodo-4-(trifluoromethyl)-2-pyridyl)-O,O-di-n-butyl phosphate;
O-(6-bromo-4-(trifluoromethyl)-2-pyridyl) O-methyl O-isopropyl phosphorothioate;
O-(6-fluoro-4-(trifluoromethyl)-2-pyridyl) phosphorodiamidothioate;
O-(6-chloro-4-(trifluoromethyl)-2-pyridyl) S-ethyl ethylphosphoramidothioate;
O-(6-iodo-4-(trifluoromethyl)-2-pyridyl) N,N'-di-n-butyl phosphorodiamidate; and
O-(6-fluoro-4-(trifluoromethyl)-2-pyridyl) S-ethyl phosphoramidothioate.

An especially preferred class of compounds in the present invention include those wherein X is chloro or fluoro and $R_1$ and $R_2$ each represent loweralkoxy or loweralkyl amino. A further preferred class of compounds are those wherein X is chloro or fluoro and $R_1$ and $R_2$ together represent loweralkoxy and loweralkylamino.

In the context of this disclosure, the term "nematicide" is employed to designate a compound that kills, inactivates, repels or otherwise prevents the destructive effects of nematodes, i.e., those members of the phylum Nemata, such as, for example, root-knot nematodes (*Meloidogyne incognita* var. *acrita*), sugar beet cyst nematodes (*Heterodera schachtii*), and the like.

The compounds of the present invention are oils or crystalline solids at room temperature and are somewhat soluble in many common organic solvents and of low solubility in water. The compounds employed in the methods of the present invention are prepared by the reaction of an alkali metal salt of 6-halo-4-(trifluoromethyl)-2-pyridinol with a selected substituted phosphorochloridothioate or phosphorochloridate of the formula:

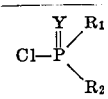

wherein Y, $R_1$ and $R_2$ are as above defined, in the presence of an inert reaction medium such as, for example, water, dimethylformamide, benzene, toluene, acetone, ethanol, acetonitrile, chloroform, and the like. The reaction ordinarily consumes the reactants in amounts representing essentially equimolar proportions of each and, while not critical, the use of such amounts is preferred. Preferably, the reaction is carried out at temperatures of from about 20° to about 65° C. for a period of from about 1 to about 4 hours, and is conducted under ambient pressure conditions. Following the completion of the reaction, the reaction mixture is filtered and washed, and the filtrate concentrated by distillation under reduced pressure to obtain the desired product as a solid or liquid residue. The product residue thus obtained can be further purified by conventional procedures such as, for example, washing, solvent extraction and recrystallization from appropriate organic solvents.

In use, these compounds are applied to areas to be protected from nematodes in any of a variety of formulations and means of application. In applying the compounds for nematode control, the compound is of course applied in an amount sufficient to exert the desired control. The required amount, however, will be governed by such variables as method of applications, area of application, time of year, temperatures, moisture, and the like. All compounds and methods of the present invention can be applied to areas to be protected from nematodes prior to crop planting. Many of the compounds of the present invention are safe to growing plants at well above the necessary use rates and can therefore be used during crop planting and also in certain standing crops.

Compositions of this invention suitable for practical use as nematicides will include one or more compounds of Formula I above either individually, in admixture with one another, or in admixture with other pesticides, and can include surface-active agents and inert carriers such as solid or liquid diluents and other inert materials as described to produce wettable powders, suspensions, emulsifiable concentrates, dusts, solutions, granules, petters or high-strength compositions.

In general, good nematicidal results are obtained when the compounds of the present invention are distributed through the soil in amounts of from about 0.12 to 1,000 parts or more by weight per million parts by weight of soil. In field applications, the active compounds may be distributed in the soil at a dosage of from about one-half to 100 or more pounds per acre foot of soil and through a cross-section of the soil as to provide for the presence therein of a nematicidal concentration of active compound. In such applications, it is desirable that the active compound be distributed to a depth of at least 12 inches below the soil surface.

The exact concentration of a compound of Formula I to be employed in compositions for the treatment of growth media may vary provided nematicidal dosages of the active compounds are supplied. The concentration of active compounds in liquid compositions employed to supply the desired dosage generally is from about 0.01 to 50 percent by weight although as high a concentration as 90 percent by weight may be employed. In dusts, the effective weight may be from about 1 to 20 percent by weight. In compositions to be employed as concentrates, the active compounds may be present in a concentration of from about 5 to 95 percent by weight.

Liquid compositions containing the desired amount of active compound may be prepared by dispersing the compound in an inert diluent such as water or an organic liquid with the aid of a suitable surface-active dispersing agent such as an ionic or non-ionic emulsifying agent. The surface-active dispersing agents are generally employed in the amount of from 1 to 20 percent by weight of the combined weight of the compound and surface-active agent in the composition. Suitable organic liquid carriers include acetone, xylene, toluene, isopropanol, polyglycols, chlorinated hydrocarbons such as methylene chloride, carbon tetrachloride, chlorobenzene and the petroleum distillates such as diesel fuel, kerosene, fuel oil, naphthas, and Stoddard solvent. Among the latter, the petroleum distillates boiling almost entirely under 400° F. at atmospheric pressure and having a flash point above 80° F. are generally preferred, however, any suitable liquid carrier or combination of carriers can be employed. The aqueous compositions may contain a small amount of a water-immiscible solvent whereby the carrier comprises an aqueous emulsion, namely, a mixture of water, emulsifying agent and organic liquid. In the liquid compositions, the choice of dispersing and emulsifying agent and the amount thereof employed are dictated by the nature of the composition and by the ability of the agent to facilitate the dispersion of the active compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active compounds are dispersed in and on finely divided inert solids such as clay, talc, chalk, gypsum and the like. In such operations, the finely divided carrier is mechanically mixed or ground with the active compound. Similarly, dust compositions containing the active compounds may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agent or with chalk, talc, diatomaceous earth or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the compounds of Formula I are dispersed in soil or growth media in any convenient fashion, e.g., by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the active compounds in soil may be accomplished by introducing the toxicants in the water employed to irrigate the soil. In such procedures, the amount of water may be varied with the porosity and water-holding capacity of the soil to obtain the desired depth of distribution of the toxicants.

DESCRIPTION OF THE PREFERRED EMBODIMENTS

The following examples illustrate the methods of the present invention but are not to be construed as limiting:

Example 1

Separate acetone solutions containing 50 grams of O-(6-chloro-4-(trifluoromethyl)-2-pyridyl) O,O-diethyl phosphorothioate and O-(6-chloro-4-(trifluoromethyl)-2-pyridyl) O,O-diethyl phosphate, respectively, per liter of solution were prepared and employed for the treatment of separate seed beds (50 gram samples) containing sandy loam soil which was heavily infested with root knot nematodes (*Meloidogyne incognita var. acarite*). At the time of treatment, the soil had a moisture content of about 6 percent. The soil samples were placed in a sealable container and thereafter treated with the fumigant composition. In the treating operations, separate portions of each of the prepared compositions were injected into separate soil samples at rates sufficient to provide 1.5 and 3.0 parts by weight respectively of each test compound per million parts by weight of infected soil. The containers of treated soil were sealed and set aside in a 70° F. constant temperature room for a period of one week.

Following the latter period, the containers were unsealed, allowed to aerate under the same conditions as set forth above for an additional week and the soil thereafter planted with cucumber seeds. Untreated check soil was also planted with cucumber seeds. During the following growth period no adverse effects upon germination and growth of seedlings attributable to the presence of residual fumigation were observed. About three weeks after planting the plants were lifted from the soil, and the roots washed and examined for evidence of attack by nematodes. Examination of the plants indicated that both test compounds gave 100 percent control of nematodes when employed at concentrations of 3.0 parts per million in soil, while the O-(6-chloro-4-(trifluoromethyl)-2-pyridyl) O,O-diethyl phosphorothioate test compound additionally gave 100 percent control of nematodes at 1.5 parts per million in soil. Concurrent examination of the roots of the plants grown in the untreated check soil showed dwarfing and heavy galling due to root knot nematodes.

Example 2

Separate aqueous compositions containing O-(6-chloro-4-(trifluoromethyl)-2-pyridyl) O,O-diethyl phosphorothioate, O-(6-chloro-4-(trifluoromethyl)-2-pyridyl) O,O-dimethyl phosphorothioate, O-(6-chloro-4-(trifluoromethyl)-2-pyridyl) N,N'-dimethyl phosphorodiamidothioate and O-(6-chloro-4-(trifluoromethyl)-2-pyridyl) O-methyl isopropylphosphoramidothioate as the sole toxicant were prepared for drench treatment of sandy loam soil samples infested with root knot nematodes (*Meloidogyne incognita var. acrita*). In such operations, a pre-determined amount of each of the phosphorothioate compounds was dissolved in acetone and separate portions of the resulting acetone solutions were mixed with water and Tween 20 (0.02 percent) in order to produce the desired aqueous treating compositions containing 5.0 parts respectively of each of the above phosphorothioate test compounds per million parts by weight of aqueous composition. The prepared aqueous compositions were added to containers of sandy loam soil in an amount sufficient to wet the soil completely. Thereafter, the treated soil samples were allowed to stand open to the air at room temperature for a period of 4 days. Following this period, cucumber seeds were planted in the treated soil samples. Checks were prepared by planting cucumber seeds in containers of the same nematode infested soil which had not been treated with the toxicant materials.

The seeded soil samples were maintained in a green house under growth conducive conditions. About 3 weeks after planting, the plants were lifted from the treated and check soil samples and the roots were washed and examined for root knot nematode control. The percent control of root galling at the employed concentration of each of the phosphorothioate compounds in nematode infested soil is set forth in the following table.

TWEEN 20 is a polyoxyethylene (20)sorbitan-monolaurate polysorbate (20) emulsifier available from Atlas Chemical Ind.

In additional operations, O-(6-chloro-4-(trifluoromethyl)-2-pyridyl) O,O-diethyl phosphorothioate gave 90 percent control of root galling when employed at a concentration of 1.0 parts per million in water (0.12 ppm/soil; 0.4 lbs/acre-foot), and 50 percent control when employed at a concentration of 0.2 parts per million in water (0.024 ppm/soil; 0.08 lbs/acre-foot).

TABLE 1

PERCENT CONTROL OF ROOT GALLING (a)

| Run No. | Test Chemical | Concentration ppm in water (b) | % Control |
|---|---|---|---|
| 1. | O-(6-chloro-4-(trifluoro-methyl)-2-pyridyl)O,O-diethyl phosphorothioate | 5.0 | 90 |
| 2. | O-(6-chloro-4-(trifluoro-methyl)-2-pyridyl) O,O-dimethyl phosphorothioate | 5.0 | 75 |
| 3. | O-(6-chloro-4-(trifluoro-methyl)-2-pyridyl) N,N'-dimethyl phosphorodiamidothioate | 5.0 | 75 |
| 4. | O-(6-chloro-4-(trifluoro-methyl)-2-pyridyl) O-methyl isopropylphosphoramidothioate | 5.0 | 100(c) |
| 5. | Solvent check (acetone) | — | 0 |

(a) Percent control =(Gall rating of check-gall rating of treatment/Gall rating of check) × 100
(b) Dosage of 5.0 ppm in water corresponds to dosage of 0.6 ppm/soil or 2.0 lbs./acre-foot.
(c) Some stunting observed.

Example 3

Aqueous compositions containing O-(6-chloro-4-(trifluoromethyl)-2-pyridyl) O,O-diethyl phosphorothioate as the sole toxicant were prepared and employed as drenches to treat sandy loam soil infested with root-lesion nematodes (*Pratylenchus sp.*). In such operations, a predetermined amount of the phosphorothioate compound was dissolved in acetone, and separate portions of the acetone solution were mixed with water and Tween 20 (0.02 percent) in order to produce the desired aqueous treating compositions containing 20.0, 5.0 and 1.2 pounds of chemical, respectively, per acre-foot of soil. The aqueous compositions were drenched around the roots of 7-week-old grape plants growing in the nematode-infested soil. Thereafter, the samples were allowed to grow under greenhouse conditions for 3 months. Following this period, the surviving nematodes were extracted from the samples by the Baermann Funnel Method and counted. Numbers of lesion nematodes from the treated samples were compared with those of the check samples and the percent control of nematodes at each concentration tested is set forth in the following Table II.

TABLE II

LESION NEMATODE CONTROL

| Run No. | Test Compound | Dose lb.A.Ft.* | % Control |
|---|---|---|---|
| 1. | O-(6-chloro-4-(trifluoromethyl)-2-pyridyl) O,O-diethyl phosphorothioate | 20.0 | 99 |
| 2. | O-(6-chloro-4-(trifluoromethyl)-2-pyridyl) O,O-diethyl phosphorothioate | 5.0 | 83 |
| 3. | O-(6-chloro-4-(trifluoromethyl)-2-pyridyl) O,O-diethyl phosphorothioate | 1.2 | 48 |
| 4. | Solvent Check (acetone) | — | 0 |

* lb./A.Ft. = pounds per acre-foot of soil
** Percent Control =(No. of nematodes for check − No. of nematodes for treatment/No. of nematodes for check)×100

TABLE III

PERCENT CONTROL OF ROOT GALLING

| Run No. | Test Chemical | Concentration ppm in Water | % Control |
|---|---|---|---|
| 1. | O-(6-fluoro-4-(trifluoromethyl)-2-pyridyl O,O-diethyl phosphorothioate | 25 | 100 |
| 2. | O-(6-fluoro-4-(trifluoromethyl)-2-pyridyl) N,N'-dimethyl phosphorodiamidothioate | 25 | 90 |
| 3. | O-(6-fluoro-4-(trifluoromethyl)-2-pyridyl) O-ethyl ethylphosphoramidothioate | 25 | 50 |
| 4. | O-(6-chloro-4-(trifluoromethyl)-2-pyridyl) O-methylate | 25 | 100 |
| 5. | O-(6-chloro-4-(trifluoromethyl)-2-pyridyl) O,O-dimethyl phosphorothioate | 25 | 75 |
| 6. | O-(6-chloro-4-(trifluoromethyl)-2-pyridyl) N,N'-dimethyl phosphorodiamidothioate | 25 | 100 |

Example 4

Separate aqueous treating compositions containing a single test compound of the present invention as the sole toxicant at a concentration of 25 parts per million parts by weight of aqueous composition were prepared as in Example 2, with the exception that isopropanol was employed in place of acetone. The prepared aqueous compositions were employed as drenches to treat sandy loam soil naturally infested with root knot nematode larvae (*Maloidogyne sp.*) having cucumber seeds placed on the surface. Control samples were prepared by placing cucumber seeds in containers of the same nematode infested soil which had not been treated with any test compound. The soil sample containers were immediately sealed and incubated at 65°–75° F. for a period of about three days. The treated soil samples were then unsealed and a slight layer of additional soil placed on top of the cucumber seeds, after which the treated samples were maintained in a greenhouse under growth conducive conditions for a period of about three weeks. Following this period, the plants from the treated and control soil samples were evaluated as in Example 2. The test compound employed and the percent control of galling (determined as in Example 2) obtained by each at the employed concentration is set forth in the following Table III.

Example 5

Separate aqueous treating compositions containing O-(6-fluoro-4-(trifluoromethyl)-2-pyridyl) O,O-diethylphosphorothioate and O-(6-chloro-4-(trifluoromethyl)-2-pyridyl) O,O-dimethyl phosphorothioate as the sole toxicant at a concentration of 25 parts per million parts by weight of aqueous composition were prepared as in Example 4. Sandy loam soil samples infested with sugar beet cyst nematodes (*Heterodera schachtii*) in place of root knot nematodes were then treated with the prepared aqueous compositions and maintained and evaluated as in Example 4. Examination of the plants indicated that the O-(6-fluoro-4-(trifluoromethyl)-2-pyridyl O,O-diethylphosphorothioate test compound gave 100 percent and the O-(6-chloro-4-(trifluoromethyl)-2-pyridyl) O,O-dimethyl phosphorothioate test compound gave 75 percent control of sugar beet cyst nematodes respectively.

When distributed through the soil in amounts from 0.12 to 1,000 or more parts by weight per million parts by weight of soil, each of the compounds of the present invention, the utility of which is not specifically recited hereinabove, has the ability to kill, inhibit or otherwise control one or more of the various types of plant pathogenic nematodes.

The O-loweralkyl phosphoramidochloridates and phosphoramidochloridothioates employed as starting materials in accordance with the teachings of the present application are prepared by reacting two molecular proportions of a suitable amine with one molecular proportion of an O-loweralkyl phosphorodichloridate or phosphorodichloridothioate at a temperature of from minus 10 to 50° C. Upon completion of the reaction, the desired product is separated by conventional methods.

The O,O-diloweralkyl phosphorochloridates and O,O-diloweralkyl phosphorochloridothioates, employed as starting materials as described herein, are prepared in known procedures by reacting phosphorus oxychloride or phosphorus thiochloride with an alkali metal alcoholate to introduce two alkoxy groups into the molecule. Where it is desired to produce the mixed diester, the phosphorus oxychloride or phosphorus thiochloride is reacted successively with different alcoholates. Good results are obtained when employing stoichiometric amounts of the reagents and operating at temperatures at which chloride of reaction is formed. Following the reaction, the desired products are separated by known procedures.

The phosphorodiamidochloridates and phosphorodiamidochloridothioates to be employed as starting materials are prepared by reacting phosphorus oxychloride or phosphorus thiochloride with a suitable amine in the presence of a hydrogen chloride acceptor to introduce the desired amino or loweralkylamino groups into the molecule. Where it is desired to produce a starting material having different amino and/or loweralkyl groups, the phosphorus oxychloride or thiochloride is reacted successively with different amines. Good results are obtained when employing stoichiometric amounts of the reactants and of hydrogen chloride acceptor, which can be an excess portion of the amine reactant, and when operating at temperatures at which chloride of reaction is formed.

The alkali metal salts of the halo-(trifluoromethyl)-pyridinols or -thiopyridines, which are employed as starting materials in the preparation of the products of the present invention, are prepared from the corresponding halo-(trifluoromethyl)-pyridinol or -thiopyridine compounds. Thus, the corresponding halo-(trifluoromethyl)-pyridinol or -thiopyridine compound is reacted with a base, which can be an alkali metal hydroxide or carbonate. These reactions to prepare the salts are preferably carried out in an inert reaction medium.

Thus, in a representative operation employing the above starting materials, 6-fluoro-4-(trifluoromethyl)-2-pyridyl O,O-diethyl phosphorothioate is prepared by reacting 6-fluoro-4-(trifluoromethyl)-2-pyridinol (8.0 grams; 0.04 mole) with O,O-diethyl phosphorochloridothioate (8.3 grams; 0.04 mole) and anhydrous sodium carbonate (4.7 grams; 0.04 mole) in the presence of dimethylformamide (80 milliliters) at ambient temperatures for a period of about 2 hours. Following the reaction period, the reaction mixture is cooled, mixed with 100 milliliters of benzene and 200 milliliters of cold water. The organic layer containing the desired product is separated, washed with 100 milliliters of a 2 percent sodium hydroxide solution and then water before being dried over anhydrous calcium sulfate. The product mixture is then filtered and evaporated under reduced pressure to yield the desired product as a light tan oil having a refractive index ($n_D^{25}$) of 1.4556.

The halo-(trifluoromethyl)pyridinol compounds employed as the alkali metal salt starting materials are prepared by reacting a corresponding halo-(trifluoromethyl)pyridine compound with an aqueous sodium hydroxide solution in an inert reaction medium. The reaction mixture is heated at a temperature of from about 95° to about 125° C. for a period of about one-half to about 3 hours or longer. Upon completion of the reaction, the reaction mixture is cooled and acidified to precipitate the desired product, which is separated and further purified according to conventional methods.

The halo-(trifluoromethyl)thiopyridine analogs are prepared in analogous procedures using sodium hydrosulfide in place of sodium hydroxide.

The halo-(trifluoromethyl)pyridine compounds employed as starting materials in forming the compounds of this invention can be prepared by intimately contacting the corresponding halo-(trichloromethyl)pyridine compounds with antimony trifluorodichloride to convert the $CCl_3$ group to a $CF_3$ group. In turn, suitable halo-(trichloromethyl)-pyridine compounds for use in preparing the corresponding trifluoromethyl derivative compounds can be prepared by contacting an appropriate methylpyridine and hydrogen chloride at temperatures of about 50° C. to produce a liquid methylpyridine hydrochloride composition and thereafter passing a suitable halogenating agent such as, for example, chlorine gas through the liquid mixture at temperatures of about 95°–110° C. while radiating the mixture. The resulting halo-(trichloromethyl)pyridine products can then be distilled from the reaction product. In another preparation, halo-(trichloromethyl)pyridine compounds can be prepared by rapidly mixing, in the vapor phase, chlorine, an appropriate methylpyridine compound and an inert diluent and subjecting the mixture to temperatures of about 400° to 490° C. for a brief contact time. The desired products can be then distilled from the resulting product stream.

Fluoro-substituted(trifluoromethyl)pyridine compounds employed in the preparation of the corresponding pyridinol starting materials are prepared by reacting chloro-(trichloromethyl)pyridine compounds with antimony trifluoro-dichloride as discussed above, and reacting the resulting chloro-(trifluoromethyl)pyridine compounds with potassium fluoride in a known manner to replace the chlorine atom on the pyridine ring with a fluorine atom.

I claim:

1. A method for the control of nematodes in soil comprising applying to said soil infested with nematodes a nematicidal amount of a substituted (trifluoromethyl)-2-pyridyl phosphorothioate or phosphate compound of the formula:

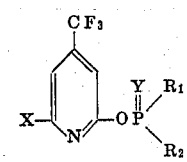

wherein

X is bromo, chloro, fluoro or iodo,

Y is oxygen or sulfur, and

R₁ and R₂ each independently represent a member selected from the group consisting of amino, loweralkyl-amino containing from 1 to 4 carbon atoms, inclusive, loweralkoxy containing from 1 to 4 carbon atoms, inclusive, and loweralkylthio containing from 1 to 4 carbon atoms, inclusive.

2. The method of claim 1 wherein the compound is applied in an amount sufficient to provide from one-half to one-hundred pounds of said substituted (trifluoromethyl)-2-pyridyl phosphorothioate or phosphate compound per acre-foot of soil.

3. The method of claim 1 wherein the compound is O-(6-chloro-4-(trifluoromethyl)-2-pyridyl) O,O-diethyl phosphorothioate.

4. The method of claim 1 wherein the compound is O-(6-chloro-4-(trifluoromethyl)-2-pyridyl) O,O-diethyl phosphate.

5. The method of claim 1 wherein the compound is O-(6-chloro-4-(trifluoromethyl)-2-pyridyl) O,O-dimethyl phosphorothioate.

6. The method of claim 1 wherein the compound is O-(6-chloro-4-(trifluoromethyl)-2-pyridyl) N,N'-dimethyl phosphorodiamidothioate.

7. The method of claim 1 wherein the compound is O-(6-chloro-4-(trifluoromethyl)-2-pyridyl) O-methyl isopropylphosphoramidothioate.

8. The method of claim 1 wherein the compound is O-(6-fluoro-4-(trifluoromethyl)-2-pyridyl) O,O-diethyl phosphorothioate.

9. The method of claim 1 wherein the compound is O-(6-fluoro-4-(trifluoromethyl)-2-pyridyl) N,N'-dimethyl phosphorodiamidothioate.

10. The method of claim 1 wherein the compound is O-(6-fluoro-4-(trifluoromethyl)-2-pyridyl) O-ethyl ethylphosphoramidothioate.

11. A composition for the control of nematodes comprising a nematicidal amount of a substituted (trifluoromethyl)-2-pyridyl phosphorothioate or phosphate compound of the formula:

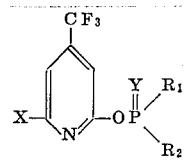

wherein

X is bromo, chloro, fluoro or iodo,

Y is oxygen or sulfur, and

R₁ and R₂ each independently represent a member selected from the group consisting of amino, loweralkylamino containing from 1 to 4 carbon atoms, inclusive, loweralkoxy containing from 1 to 4 carbon atoms, inclusive, and loweralkylthio containing from 1 to 4 carbon atoms, inclusive, in intimate admixture with an inert carrier.

12. The composition of claim 11 wherein the compound is O-(6-chloro-4-(trifluoromethyl)-2-pyridyl) O,O-diethyl phosphorothioate.

13. The composition of claim 11 wherein the compound is O-(6-chloro-4-(trifluoromethyl)-2-pyridyl) O,O-diethyl phosphate.

* * * * *

UNITED STATES PATENT OFFICE
CERTIFICATE OF CORRECTION

Patent No. 3,794,724      Dated February 26, 1974

Inventor(s) Frances C. O'Melia

It is certified that error appears in the above-identified patent and that said Letters Patent are hereby corrected as shown below:

Column 7, Table II, under column headed "% Control", please insert double asterisks (**) after the word "Control";

Column 8, Table III, under column headed "Test Chemical" for Run No. 4, the compound should read as follows: O-(6-chloro-4-(trifluoromethyl)-2-pyridyl) O-methyl isopropylphosphoramidothioate.

Signed and sealed this 5th day of November 1974.

(SEAL)
Attest:

McCOY M. GIBSON JR.      C. MARSHALL DANN
Attesting Officer      Commissioner of Patents

C-15,778